Patented Feb. 20, 1940

2,191,405

UNITED STATES PATENT OFFICE 2,191,405

MANUFACTURE OF AQUEOUS SOLUTIONS OF PHENOL, ITS HOMOLOGUES AND DERIVATIVES

Richard Hueter, Richard Neu, and Heinz-Joachim Engelbrecht, Dessau-Rosslau in Anhalt, Germany, assignors, by mesne assignments, to "Unichem" Chemikalien Handels A.-G., Zurich, Switzerland, a corporation of Switzerland No Drawing. Application May 21, 1936, Serial No. 81,020. In Germany May 25, 1935

7 Claims. (Cl. 167—31)

It has already been suggested that phenols and their homologues can be rendered water-soluble by means of sodium salts of benzene-sulfonic acid, potassium salts of di-hydroxy-stearic acid, alkali salts of phenanthrene- or hydrindene sulfonic acid as well as salts of the o-hydroxy benzoic acid or of the naphthaline-sulfonic acid. Sodium or potassium salts of ricinol-sulfonic acid as well as potassium salts of rincinolic acid have also been recommended for solubilizing phenols. All these compounds have the disadvantage that the phenol-solutions made with them are inclined to separate during cold weather or require the presence of high concentrations of the solubilizing agents. Moreover solutions made in this way do not give clear liquids when they are diluted with water. Therefore desirable results require the addition also of organic solvents such as alcohol or glycerin to the solution obtained from the above cited compounds and phenols, which, however, entails other drawbacks. Furthermore the potassium soaps obtained from vegetal oils hitherto applied in many a case to render phenols soluble, are unfit for such purposes because the alkali delivered by the hydrolysis replaces the hydrogen atom of the hydroxyl group in the phenol whereby the phenol loses its bacteria destroying effect.

Now it has been found that it is possible to obtain clear solutions of phenol, its homologues and substitution products obtained from the latter as well as mixtures of same, in water or in aqueous liquids and to dilute these solutions to any desired degree by using for this purpose the sulfonation products of aliphatic alcohols with no less than 6 and no more than 10 carbon atoms, or of their ethers with polyvalent alcohols either alone or mixed with one another. Suitable sulfonating alcohols are, for instance, the sulfonation products of the hexyl-, heptyl-, octyl-, nonyl- and decyl-alcohol as well as their mixtures such as are formed, for example, in the first runnings of the fatty alcohols obtainable by the catalytic high pressure reduction of cocoanut- or palmkernel fat. Other suitable solubilizing agents are obtained by the sulfonation of ethers of the said alcohols derived from polyvalent alcohols, such as glycol, glycerin, pentaerythrite, mannite, sorbite and the like.

Sulfonates and sulfonation products are to be understood to include the products obtainable with the reaction of well-known sulfonating agents such as sulfuric acid, chlor-sulfonic acid, oleum (fuming sulfuric acid), sulfuric anhydride, etc., i. e., after the neutralisation with alkalis, ammonia or organic bases.

It is a known fact that the sulfonation products of the higher molecular aliphatic alcohols and particularly of those with 12 or more carbon atoms, are excellent wetting, emulsifying and dispersing agents and that they are recommended for many and varied purposes. Such fatty alcohol sulfonates do not increase the solubility of the phenols and particularly their substitution products such as halogen-phenols, alkoxy-phenols, nitro-phenols and others, in water or aqueous solutions to a degree which gives stable solutions at ordinary temperatures which are capable of being diluted with water in any proportion without becoming turbid even after standing for a considerable period of time.

The sulfonates of the aliphatic alcohols or of their alkoxylation products with polyvalent alcohols, as disclosed hereinbefore as being especially useful in the instant invention, do not show an alkaline reaction in an aqeous solution as do soaps. Hence the efficiency of the phenolic bodies is not diminished through the formation of alkali phenols as is the case when soaps are used.

In the practice of the instant invention it is not necessary to use the sulfonates derived from aliphatic alcohols with no less than 6 and no more than 10 carbon atoms exclusively, as in certain cases it may even be advantageous to use sulfonates in a certain quantity which contain higher fatty alcohol sulfonates having, for example, a chain-length of 12-18 carbon atoms, thereby imparting to the total mixture rather strongly marked soap properties and enhancing considerably its wetting and penetrating power.

So long as the ratio of such sulfonates of higher molecular aliphatic alcohols does not exceed certain limits depending upon their molecular weight and their dissolving capacity, the solubility of the mixtures with phenol will not be adversely influenced by such an addition, nor will their disinfecting power be diminished. The sulfonates derived from aliphatic alcohols with no less than 6 and no more than 10 carbon atoms are to be present in a predominating amount, however. Only upon considerable additions of sulfonates of the alcohols with more than 10 carbon atoms are the disinfecting powers affected in the same manner as by the action of the soap. Yet this influence may easily be avoided by limiting the portion of those sulfonates and by adjusting the proportion of sulfonate to the disinfecting agent.

The aqueous solutions of the phenolic bodies made with polyvalent alcohols by means of the sulfonating products of aliphatic alcohols with no less than 6 and no more than 10 carbon atoms or, respectively, of their ethers, either alone or with an addition of sulfonates of higher molecular aliphatic alcohols or of their ethers respectively, are advantageously applied in human and veterinary medicine. Moreover such solutions may be used for the extermination of damaging pest as well as to prevent the forming of mould or any decomposition processes or the like in the starch, sizing, leather, textile, soap and food industries. These solutions may be used advantageously in the paint industry and also as an addition to other preparations.

Example 1

In dissolving 110 g. of a paste, neutralized with sodium lye, of the sulfonation product of fatty alcohols with 8–10 carbon atoms (36%-fatty alcohol portion) in 200 g. of distilled water, it is possible by warming on a water-bath, to dissolve readily in this solution 15 g. of chlor-carvacrol or chlor-thymol. This solution is then diluted with water in the ratio of 1:100 and serves as an addition to sizing-baths or the like in order to prevent the forming of mould fungus. It may also be applied in the preparation of mouth-rinsing lotions, where a clear solution is particularly desirable.

Example 2

Upon dissolving 50 g. of the fatty alcohol-sulfonate-paste described in Example 1 in 125 g. of distilled water and then dissolving therein, while warming up to 50°, 15 g. of p-chlor-m-cresol, a clear liquid dilutable with water to any degree is obtained which is suitable for the mixing of glue-water colours or as an addition to starch-paste.

Example 3

40 g. of a 25%-paste neutralized with caustic soda and obtained by the sulfonating of glycerin-mono-octyl-ether are mixed with 100 g. of water and 10 g. of p-chlor-m-cresol and heated on a water-bath until a complete solution is attained. Cholera bacillus or the like are killed within less than one minute by such solutions.

Example 4

15 g. of chlor-xylenol are introduced into a solution of 80 g. of the fatty alcohol sulfonate, as described in Example 1, dissolved in 200 g. of water. Then the chlor-xylenol is solubilized in this solution by mild heating. This solution may be generally used for the attainment of a distinfecting action in the manufacture of detergents such as, for example, in liquid soaps or for the same purpose in cosmetic preparations. Moreover it may be used per se in the practice of human and veterinary medicine.

Example 5

A suitable aqueous solution of sulfonates is obtainable from the alcohols of the first runnings distilled off from a fatty alcohol mixture obtained by high presure-reduction of the cocoa oil. Such first runnings consist of about 80% of octyl- and decyl-alcohol and about 20% of lauryl-alcohol. The aqueous solutions are properly adjusted by dilution to a fat-proportion of 16.9%, whereupon 1.8% of p-chlor-m-cresol, 1.8% of chlor-xylenol, 1.0% of chlor-thymol and 1.6% of chlor-carvacrol are added. A clear solution is obtained which remains clear even after a dilution to 200 times its volume, while at the same time exerting a very strong bacteria destroying effect on bacterium coli as well as on staphylo-coccus aureus.

The amount of the sulfonates in the mother-solution may be reduced more than one half without the phenol solution becoming turbid on being diluted.

Example 6

A suitable solvent is obtained by dissolving in water the mixtures of solfonates from fatty alcohols with 8–10 carbon atoms in the molecule and from higher molecular non-saturated fatty alcohols such as olein alcohol or caster oil-alcohol at the ratio of 4:1. The disinfectants produced in a similar way as shown in Example 5 are clear and stable even in using hard water. These solutions too show rather high disinfection-properties to bacteria, fungus and the like.

We claim:

1. An aqueous solution of predominantly phenolic character containing a phenol of the group consisting of phenol, halogen-phenols alkoxy-phenols, nitro-phenols and as a dissolving agent a sulfonate of fatty material of the group consisting of the fatty alcohols having 6 to 10 carbon atoms in the molecule and the ethers of such alcohols with glycol, glycerin, pentaerythrite, mannit and sorbite.

2. An aqueous solution of predominantly phenolic character containing a phenol of the group consisting of phenol, halogen-phenols, alkoxy-phenols, nitro-phenols and as a dissolving agent a sulfonate of fatty material of the group consisting of the fatty alcohols having 6 to 10 carbon atoms in the molecule and the ethers of such alcohols with glycol, glycerin, pentaerythrite, mannit and sorbite, together with a sulfonate of a fatty alcohol having 12 to 18 carbon atoms in the molecule.

3. An aqueous solution of predominantly phenolic character containing a phenol of the group consisting of chlorphenol, chlorcresol, chlorxylenol, chlorcarvacrol and chlorthymol and as a dissolving agent a sulfonate of a fatty alcohol having 8 to 10 carbon atoms in the molecule.

4. An aqueous solution of predominantly phenolic character containing a phenol of the group consisting of chlorphenol, chlorcresol, chlorxylenol, chlorcarvacrol and chlorthymol and as a dissolving agent a sulfonate of a fatty alcohol having 8 to 10 carbon atoms in the molecule together with a sulfonate of a fatty alcohol having 12 to 18 carbon atoms in the molecule.

5. A clear aqueous solution of predominantly phenolic character containing chlorcresol and as a dissolving agent a sulfonate of a fatty alcohol having 8 to 10 carbon atoms in the molecule.

6. A clear aqueous solution of predominantly phenolic character containing chlorxylenol, chlorthymol and chlorcarvacrol and as a dissolving agent a sulfonate of an alcohol having 8 to 10 carbon atoms in the molecule.

7. A clear aqueous solution of predominantly phenolic character containing chlorcarvacrol and as a dissolving agent a sulfonate of an alcohol having 8 to 10 carbon atoms in the molecule.

RICHARD HUETER.
RICHARD NEU.
HEINZ-JOACHIM ENGELBRECHT.